US006931646B2

(12) United States Patent
Dubal

(10) Patent No.: US 6,931,646 B2
(45) Date of Patent: Aug. 16, 2005

(54) ACCESSING A TRANSLATED RESOURCE DESCRIPTOR OF A HARDWARE DEVICE

(75) Inventor: Scott P. Dubal, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 692 days.

(21) Appl. No.: 09/895,469

(22) Filed: Jun. 29, 2001

(65) Prior Publication Data

US 2003/0005176 A1 Jan. 2, 2003

(51) Int. Cl.⁷ .............................................. G06F 13/14
(52) U.S. Cl. ............................. 719/327; 710/8; 710/10; 710/15; 713/1
(58) Field of Search ................................ 719/321–327; 713/1, 2, 100; 710/1–317

(56) References Cited

U.S. PATENT DOCUMENTS

| | | | | |
|---|---|---|---|---|
| 5,828,899 A | * | 10/1998 | Richard et al. ................. 710/8 |
| 6,243,773 B1 | * | 6/2001 | Mahalingam ............... 710/302 |
| 6,345,319 B2 | * | 2/2002 | Lin et al. ........................ 710/8 |
| 6,493,770 B1 | * | 12/2002 | Sartore et al. .................. 710/8 |
| 6,591,358 B2 | * | 7/2003 | Jaffrey .......................... 712/32 |
| 6,636,901 B2 | * | 10/2003 | Sudhakaran et al. ........ 719/327 |
| 6,711,630 B2 | * | 3/2004 | Dubal et al. ................... 710/8 |
| 6,714,992 B1 | * | 3/2004 | Kanojia et al. ............. 719/321 |

* cited by examiner

*Primary Examiner*—St. John Courtenay, III
(74) *Attorney, Agent, or Firm*—Blakely, Sokoloff, Taylor & Zafman LLP

(57) ABSTRACT

A method for accessing a main resource descriptor for a hardware device. A device driver accesses a hardware device's partial resource descriptor of a translated main resource descriptor stored in an operating system registry. The device driver accesses raw BIOS-assigned configuration information for the hardware device. The device driver compares the memory address in base address register 0 of the partial resource descriptor to the memory address in base address register 0 of the BIOS-assigned configuration information. The device driver selects the translated main resource descriptor that contains the partial resource descriptor with the memory address in base address register 0 that matches the memory address in base address register 0 for the raw BIOS-assigned configuration information.

32 Claims, 4 Drawing Sheets

ACCESSING A TRANSLATED RESOURCE DESCRIPTOR OF A HARDWARE DEVICE

FIELD OF THE INVENTION

The invention relates to accessing a translated resource descriptor of a hardware device.

BACKGROUND OF THE INVENTION

A bus is a component of a computer system that supplies a physical connection to hardware devices. There are a number of different bus architectures with different electrical and logical characteristics. Peripheral Component Interconnect (PCI) is one type of bus architecture. See, e.g., *PCI Local Bus Specification Revision 2.2*, released Dec. 18, 1998. The Plug-and-Play (PnP) hardware standard is incorporated into the design for PCI. See, for example, *Plug and Play Design Specification for Institute of Electrical and Electronics Engineers (IEEE)* 1394 version 1.0c, published Mar. 3, 1999; revisions May 1999.

The goal of PnP is to enable a user to plug a new hardware device into a computer, and immediately be able to use the hardware device without the user performing complicated configuration tasks. In order for PnP to work, the computer's basic input/output system (BIOS) and operating system, and the hardware device being installed, among other things, must be PnP compliant. One of the complicated configuration tasks a user avoids when installing a PnP hardware device is resource allocation. Resources, also known as system resources, are used for communication and information transfer among hardware devices in a computer. An interrupt request (IRQ) and a direct memory access (DMA) are examples of resources.

With PnP, the computer's BIOS and operating system allocate resources as part of the configuration process, without the need for user input. At power-up, the BIOS identifies a hardware device on a particular bus, and generates configuration information for the hardware device. The BIOS repeats this process until configuration information is generated for each hardware device on each bus of the computer. BIOS-assigned configuration information is referred to as raw configuration information, because it is bus-specific information.

Once the BIOS assigns raw configuration information for the hardware devices, the operating system completes the configuration process. Bus-specific enumerators in the operating system access raw BIOS-assigned configuration information for hardware devices, and store the raw BIOS-assigned configuration information in an area of the operating system called the registry. The operating system then converts the raw BIOS-assigned configuration information into translated information which the operating system can access without regard to the configuration information's bus, and stores the translated configuration information in the registry. The translated configuration information for a hardware device is referred to as a translated resource descriptor. The translated resource descriptor contains a list of partial resource descriptors for the hardware device. Each partial resource descriptor identifies a resource, e.g., an IRQ, allocated to the hardware device.

Once resources are allocated, the operating system loads the device driver for the hardware device. A device driver is software that controls the physical functions of a hardware device, and manages data transfers for the hardware device. After loading the device driver, the operating system transmits to the device driver the translated resource descriptor for the device.

If a device driver for a hardware device does not load properly, the hardware device will not function. In that case, a user can run a diagnostic program to determine the source of the problem. The PROSet Utility, manufactured by Intel Corporation of Santa Clara, Calif., is an example of such a diagnostic program. The operating system loads a device driver provided with the diagnostic program that is different than the device driver that failed to properly load. The diagnostic program can then perform tests to determine why the hardware device's device driver failed to properly load.

Like the hardware device's device driver, the diagnostic program's device driver needs the translated resource descriptor for the hardware device in order to function properly. However, because the diagnostic program's device driver is not the device driver for the hardware device, the operating system does not transmit the translated resource descriptor to the diagnostic program's device driver.

A kernel mode device driver can access the translated resource descriptor of a PnP hardware device connected to a PCI bus, for example, even though the kernel mode device driver is not the device driver for the PnP hardware device, if the computer is running a Windows PnP compliant operating system, manufactured by Microsoft Corporation of Redmond, Wash. If a diagnostic program is using a kernel mode device driver, the kernel mode device driver can make "legacy operating system calls" to the Windows operating system's hardware abstraction layer (HAL) to access the translated resource descriptor for the PnP hardware device. The diagnostic program can then determine why the hardware device's device driver failed to properly load. However, it is contemplated that future releases of Windows PnP complaint operating systems will not respond to legacy operating system calls to the HAL. Thus, a kernel mode device driver utilized by a diagnostic program will not be able to access the translated resource descriptor of a PnP hardware device connected to a PCI bus.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

A method of accessing the translated resource descriptor of a hardware device is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

A method of accessing the translated resource descriptor of a hardware device is described. Each PnP hardware device has BIOS-assigned configuration information, and a translated resource descriptor. The translated resource descriptor contains a list of partial resource descriptors, one of which has a memory address in base address register 0 that matches the memory address in base address register 0 of the BIOS-assigned configuration information. A device driver that cannot otherwise access the translated resource descriptor for a hardware device, can compare the memory address in base address register 0 of each partial resource descriptor, to the memory address in base address register 0 of the BIOS-assigned configuration information for the hardware device. If the device driver identifies the partial resource descriptor with the memory address in base address register 0 that matches the memory address in base address register 0 of the BIOS-assigned configuration information, the device driver selects the partial resource descriptor's translated resource descriptor, and stores it.

Figure 1:
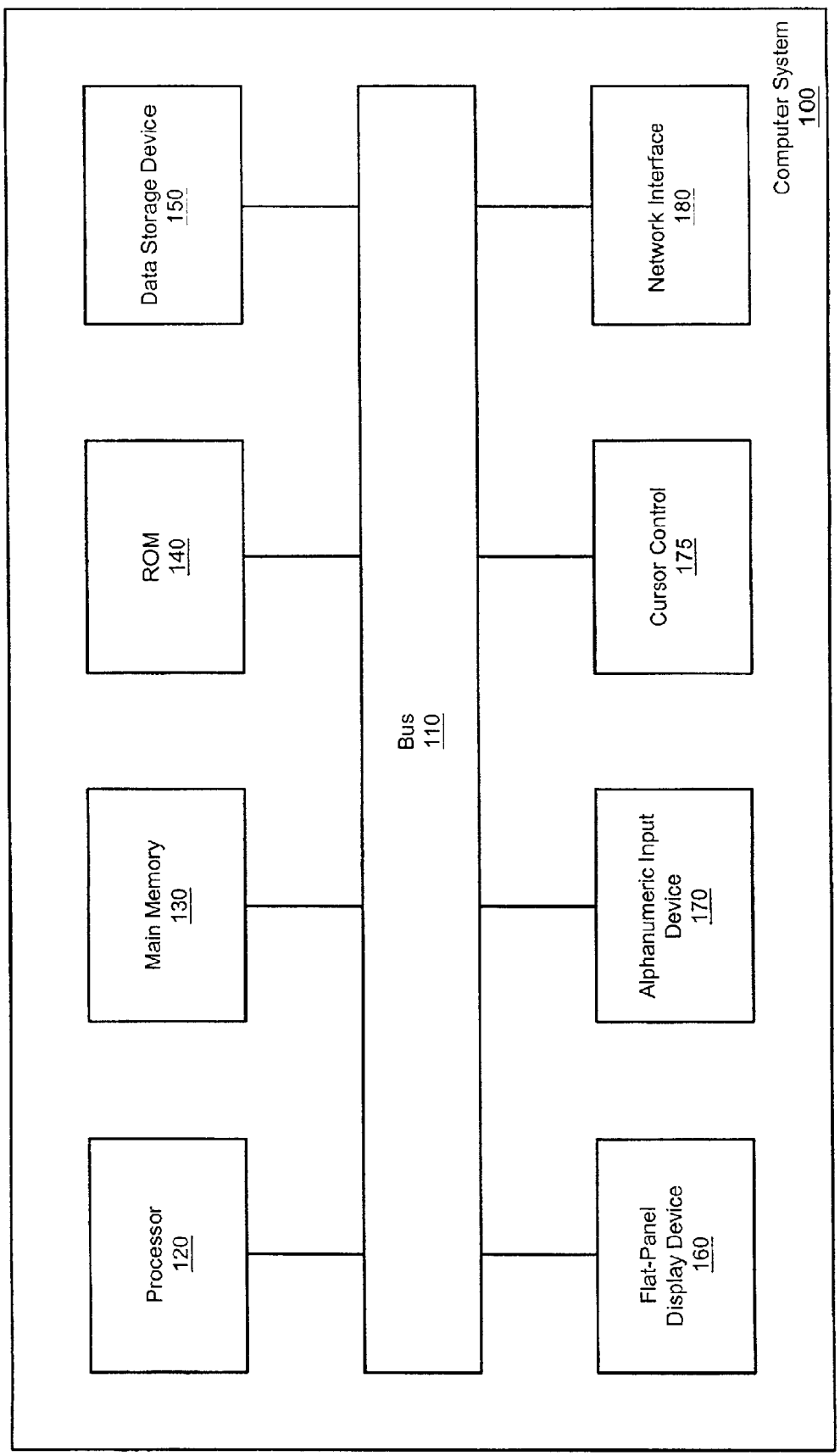
FIG. 1 is one embodiment of a computer system.

FIG. 1 is a block diagram of one embodiment of a computer system. The computer system is intended to represent a range of computer systems. Other computer systems can include more, fewer and/or different components.

Computer system 100 includes a bus 110 or other communication device to communicate information, and processor 120 coupled to bus 110 to process information. While computer system 100 is illustrated with a single processor, computer system 100 can include multiple processors and/or co-processors. Bus 110 encompasses all buses that may be present in a computer system, e.g., a Peripheral Component Interconnect (PCI) bus; a Personal Computer Memory Card International Association (PCMCIA) bus; a Universal Serial Bus (USB), etc. See, e.g., *PCI Local Bus Specification Revision* 2.2, released Dec. 18, 1998; *PC Card Standard*, March 1997 Release, First Printing; *Universal Serial Bus Specification Revision* 2.0, issued Apr. 27, 2000.

Computer system 100 further includes random access memory (RAM) or other dynamic storage device 130 (referred to as main memory), coupled to bus 110 to store information and instructions to be executed by processor 120. Main memory 130 also can be used to store temporary variables or other intermediate information while processor 120 is executing instructions. Computer system 100 also includes read-only memory (ROM) and/or other static storage device 140 coupled to bus 110 to store static information and instructions for processor 120. In addition, data storage device 150 is coupled to bus 110 to store information and instructions. Data storage device 150 may comprise a magnetic disk (e.g., a hard disk) or optical disc (e.g., a CD-ROM) and corresponding drive.

Computer system 100 may further comprise a flat-panel display device 160, such as a cathode ray tube (CRT) or liquid crystal display (LCD), to display information to a user. Alphanumeric input device 170, including alphanumeric and other keys, is typically coupled to bus 110 to communicate information and command selections to processor 120. Another type of user input device is cursor control 175, such as a mouse, a trackball, or cursor direction keys to communicate direction information and command selections to processor 120 and to control cursor movement on flat-panel display device 160. Computer system 100 further includes network interface 180 to provide access to a network, such as a local area network.

Instructions are provided to memory from a machine-accessible medium, or an external storage device accessible via a remote connection (e.g., over a network via network interface 180). A machine-accessible medium includes any mechanism that provides (i.e., stores and/or transmits) information in a form readable by a machine (e.g., a computer). For example, a machine-accessible medium includes RAM; ROM; magnetic or optical storage medium; flash memory devices; electrical, optical, acoustical or other form of propagated signals (e.g., carrier waves, infrared signals, digital signals); etc.

In alternative embodiments, hard-wired circuitry can be used in place of or in combination with software instructions to implement the present invention. Thus, the present invention is not limited to any specific combination of hardware circuitry and software instructions.

Figure 2:
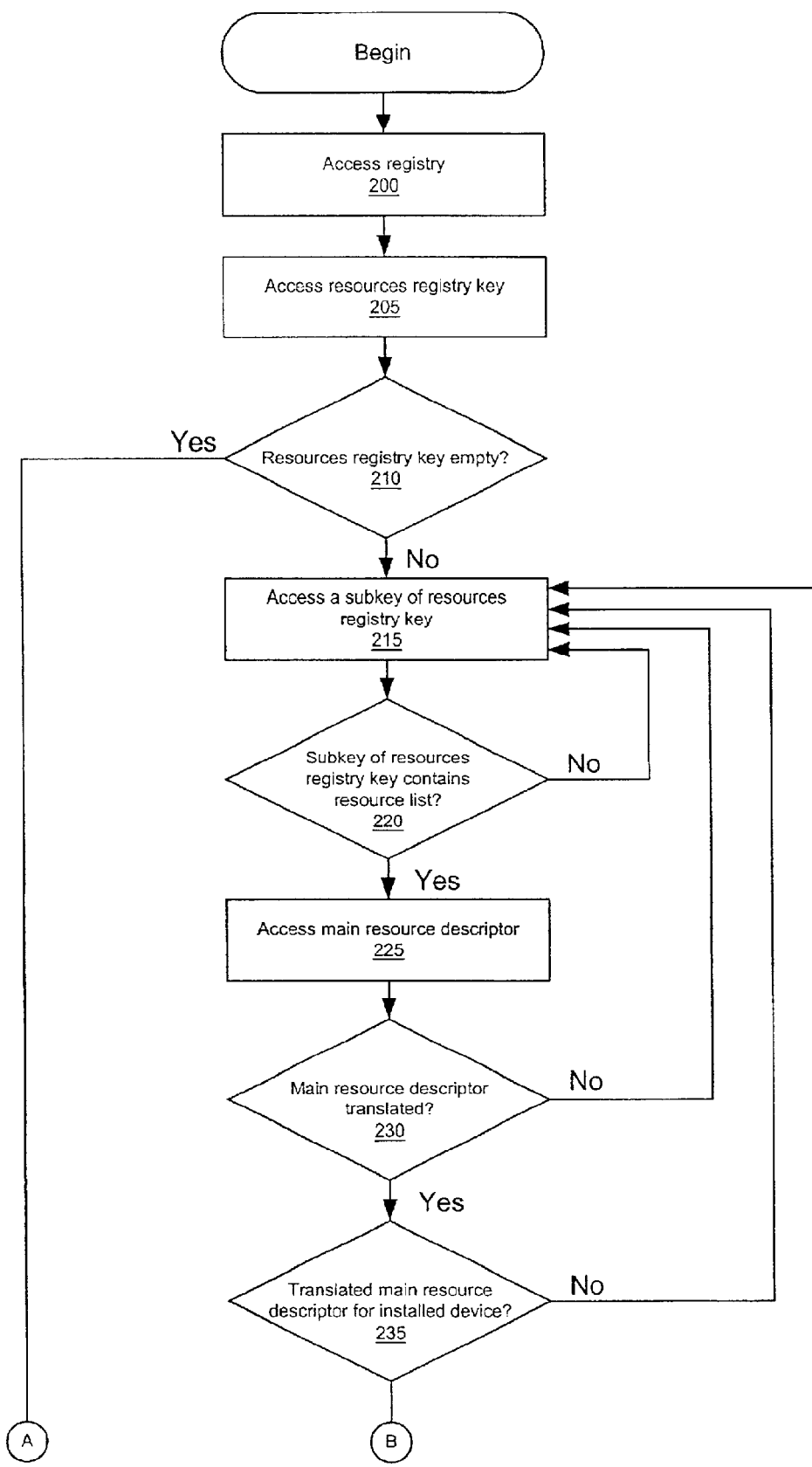
FIG. 2 is a flow diagram of accessing the translated resource descriptor of a hardware device.
Figure 2:
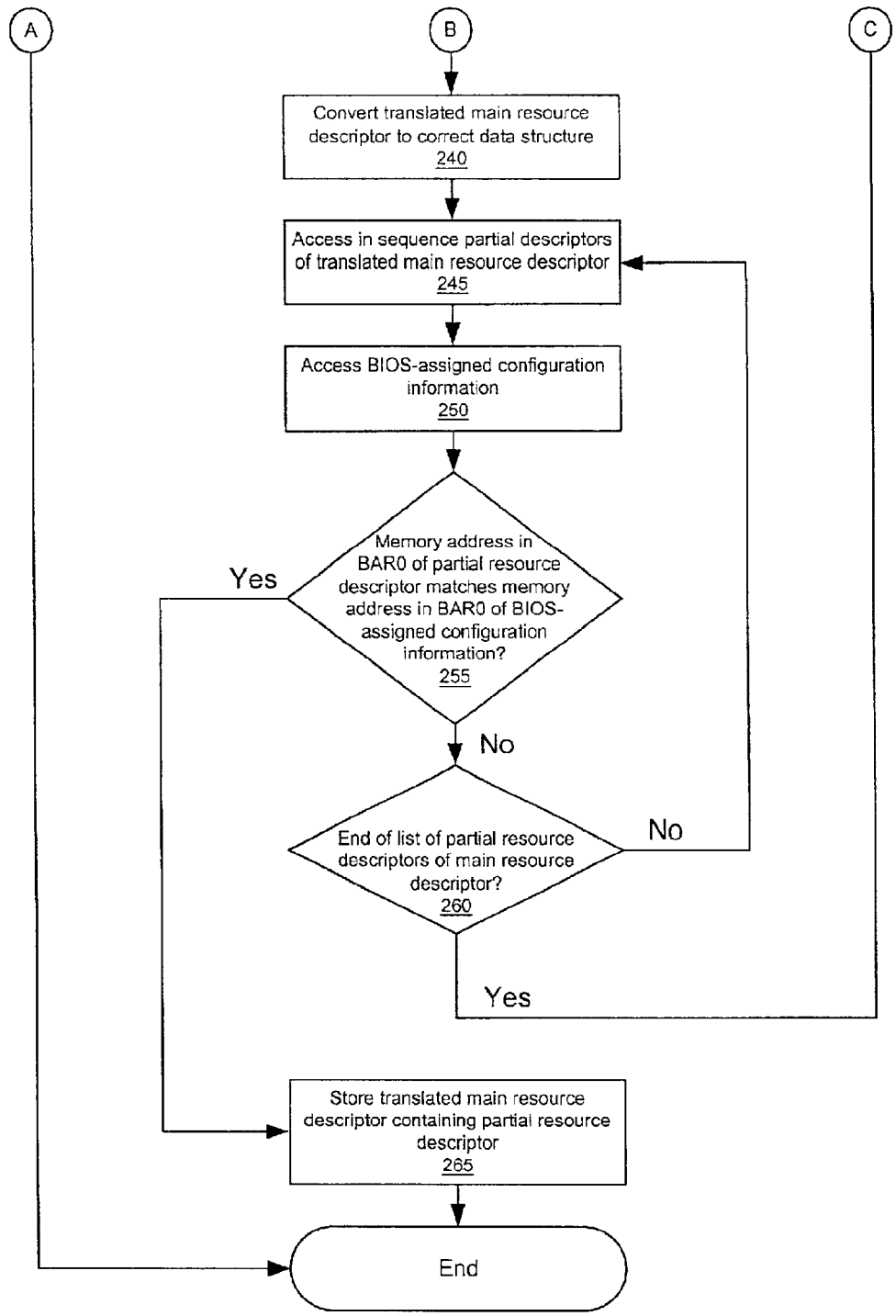

FIG. 2 is a flow diagram of an algorithm that is embodied in the code for a device driver, in order to enable the device driver to access the translated resource descriptor of a hardware device in accordance with the invention. For purposes of illustration and ease of explanation, FIG. 2 will be described in specific terms of a kernel mode device driver accessing the translated resource descriptor of a PnP hardware device (herein referred to as the PCI PnP hardware device), such as a network adapter, connected to a PCI bus in a computer running the Windows NT operating system, manufactured by Microsoft Corporation of Redmond, Wash. However, the device driver can be a device driver other than a kernel mode device driver accessing information regarding the hardware device. The information being accessed can be information other than the translated resource descriptor. The hardware device can be any hardware device connected to a bus architecture other than PCI, for example, USB. The operating system can be any operating system that has stored the information the device driver is attempting to access, and has not transmitted that information to the device driver.

At 200, the kernel mode driver accesses Windows NT's registry. The registry consists of keys, and at 205, the kernel mode device driver accesses the registry key "HKEY__ LOCAL__MACHINE/HARDWARE/RESOURCEMAP/ Plug and Play Manager/Plug and Play Manager" (herein referred to as the "Resources Registry Key"). Each release of the Windows operating system starting with Windows 2000 has the Resources Registry Key, which contains information regarding the resources allocated to each PnP hardware device in a computer.

At 210, the kernel mode device driver determines whether the Resources Registry Key is empty. If the Resources Registry Key contains a value of NLLL, then the registry key is empty, and the kernel mode device driver ends its search, because an empty registry key does not contain any resource descriptors.

If the Resources Registry Key is not empty, at 215 the kernel mode device driver accesses the first subkey of the Resources Registry Key, and at 220 determines whether the subkey contains the information "REG__RESOURCE__ LIST" (herein referred to as the "Resource List"). The Resource List contains a list of resources allocated to a PnP hardware device. If the Resource List is not present, the kernel mode device driver accesses the next subkey of the Resources Registry Key and begins the process again.

If a subkey of the Resources Registry Key contains the Resource List, then at 225 the kernel mode device driver accesses the Resource List's main resource descriptor. The main resource descriptor contains a list of partial resource descriptors for a PnP hardware device, and each partial resource descriptor identifies a resource, e.g., an IRQ, allocated to the PnP hardware device.

At 230, the kernel mode device driver determines certain information regarding the main resource descriptor, specifically whether the main resource descriptor is translated, rather than raw. With Windows NT, a translated main resource descriptor contains the character string "translated." If the main resource descriptor is not translated, the kernel mode device driver accesses the next subkey of the Resources Registry Key and begins the process again.

If the main resource descriptor is translated, then at 235, the kernel mode device driver determines whether the translated main resource descriptor is for an installed PnP hardware device. With Windows NT, a translated main resource descriptor for an installed device contains the character string "NTPNP." If the "NTPNP" character string is not present, then the kernel mode device driver accesses the next subkey of the Resources Registry Key and begins the process again.

At 240, if the translated main resource descriptor in the Resource List is for an installed PnP hardware device, then the kernel mode device driver converts the translated main resource descriptor to a recognizable data structure. For example, with the kernel mode device driver, this data structure is the "CM_RESOURCE_LIST" data structure. At 245, the kernel mode device driver accesses in sequence the partial resource descriptors in the translated main resource descriptor. At 250, the kernel mode device driver accesses the BIOS-assigned PCI configuration information for the PCI PnP hardware device, so that at 255, the kernel mode device driver can compare the memory address in base address register 0 (also referred to as "BAR0") of the partial resource descriptor, to the memory address in base address register 0 of the BIOS-assigned PCI configuration information.

If the memory address in base address register 0 of a partial resource descriptor does not match the memory address in base address register 0 of the BIOS-assigned PCI configuration information, the kernel mode device driver at 260 determines whether the non-matching partial resource descriptor was the last partial resource descriptor of the translated main resource descriptor. If the non-matching partial resource descriptor was the last partial resource descriptor of the translated main resource descriptor, the kernel mode device driver accesses the next subkey of the Resources Registry Key and begins the process again. If the non-matching partial resource descriptor was not the last partial resource descriptor of the translated main resource descriptor, the kernel mode device driver accesses the next partial resource descriptor of the translated main resource descriptor.

The kernel mode device driver continues to compare the memory addresses in base address register 0 of the partial resource descriptors, to the memory address in base address register 0 of the BIOS-assigned PCI configuration information. The kernel mode device driver will either get to the end of the partial resource descriptors of the translated main resource descriptor, in which case the kernel mode device driver will access the next subkey of the Resources Registry Key to begin the entire process again, or find that the memory addresses match. If the memory address in base address register 0 of a partial resource descriptor matches the memory address in base address register 0 of the BIOS-assigned PCI configuration information, the kernel mode device driver has identified the translated main resource descriptor for the PCI PnP hardware device. At 265, the kernel mode device driver stores the translated main resource descriptor that contains the partial resource descriptor with the memory address in base address register 0 that matches the memory address in base address register 0 of the BIOS-assigned PCI configuration information.

FIG. 2 describes the invention in terms of a method. However, one should also understand it to represent a machine-accessible medium having recorded, encoded or otherwise represented thereon instructions, routines, operations, control codes, or the like, that when executed by or otherwise utilized by the machine, cause the machine to perform the method as described above or other embodiments thereof that are within the scope of this disclosure.

Figure 3:
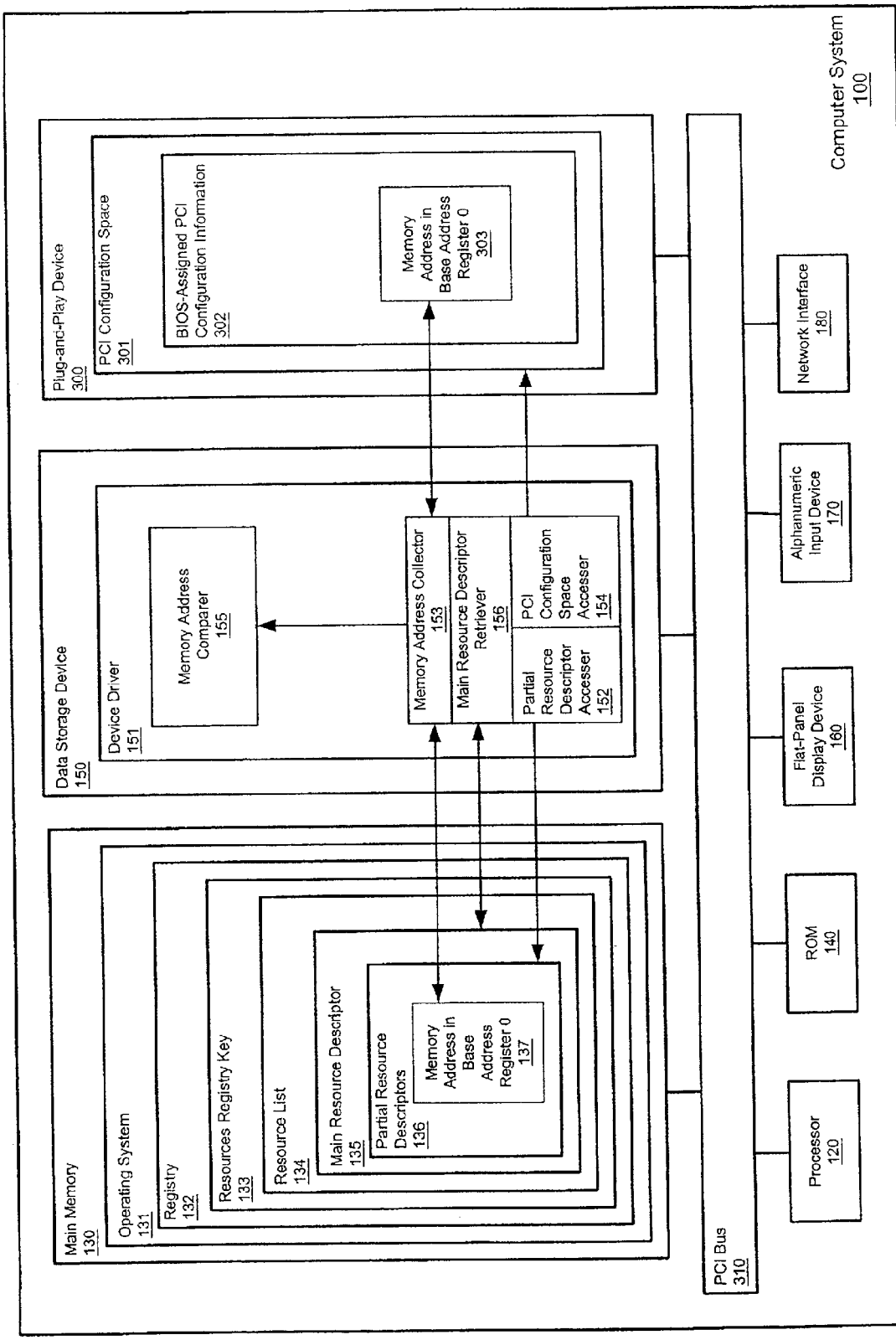
FIG. 3 is an apparatus for accessing the translated resource descriptor of a hardware device.

FIG. 3 is computer system 100 modified to include one embodiment of the invention. Computer system 100 contains a device driver 151 in data storage device 150, PnP hardware device 300, and operating system 131 in main memory 130.

Partial resource descriptor accesser 152 accesses registry 132, then accesses resources registry key 133, and determines whether resources registry key 133 is empty. If resources registry key 133 is not empty, partial resource descriptor 152 determines whether a subkey (not shown) of resources registry key 133 contains resource list 134. If the subkey of resources registry key 133 contains resource list 134, partial resource descriptor accesser 152 accesses main resource descriptor 135 to determine whether main resource descriptor 135 is translated and for an installed hardware device. Finally, if main resource descriptor 135 is translated and for an installed hardware device, then partial resource descriptor accesser 152 accesses partial resource descriptors 136 in sequence.

For each partial resource descriptors 136, memory address collector 153 of device driver 151 determines the memory address in base address register 0 137, and passes the memory address in base address register 0 137 to memory address comparer 155. PCI configuration space accesser 154 accesses PCI configuration space 301 of PnP hardware device 300. Memory address collector 153 determines the memory address in base address register 0 303 of BIOS-assigned PCI configuration information 302, and passes the memory address in base address register 303 to memory address comparer 155. Once the memory address in base address register 0 137 of a partial resource descriptors 136 matches the memory address in base address register 0 303 of BIOS-assigned PCI configuration information 302, then main resource descriptor retriever 156 retrieves main resource descriptor 135 that contains the one of partial resource descriptors 136 with the matching memory address in base address register 0 137.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
   accessing configuration information of a first type for a device connected to a bus;
   accessing configuration information of a second type for the device;
   comparing a memory location of the configuration information of the first type to a memory location of the configuration information of the second type; and
   selecting the configuration information of the first type if the memory location of the configuration information of the first type matches the memory location of the configuration information of the second type.

2. The method of claim 1, wherein the bus further comprises a Peripheral Component Interconnect bus.

3. The method of claim 1, wherein the bus further comprises a Universal Serial Bus.

4. The method of claim 1, wherein selecting the configuration information further comprises storing the configuration information.

5. A method of enabling a device driver to access a translated resource descriptor of a Plug-and-Play device connected to a bus, comprising:
 accessing a registry of a Windows Plug-and-Play compliant operating system;
 accessing a registry key of the registry;
 determining that the registry key is not empty;
 determining that a subkey of the registry key contains a resource list;
 accessing a main resource descriptor in the resource list;
 making a determination that the main resource descriptor is translated;
 making a determination that a translated main resource descriptor is for an installed device;
 converting the translated main resource descriptor to a data structure for the device driver;
 accessing a partial resource descriptor of the translated main resource descriptor;
 accessing raw basic input/output system (BIOS)-assigned configuration information for the device;
 comparing a memory address location of the raw BIOS-assigned configuration information to the memory address location of the partial resource descriptor; and
 selecting the translated main resource descriptor containing the partial resource descriptor with the memory address location that matches the memory address location of the raw BIOS-assigned configuration information.

6. The method of claim 5, wherein the device driver further comprises a kernel mode device driver.

7. The method of claim 5, wherein the device further comprises a network adapter.

8. The method of claim 5, wherein the bus further comprises a Peripheral Component Interconnect bus.

9. The method of claim 5, wherein the bus further comprises a Universal Serial Bus.

10. The method of claim 5, wherein the Windows PnP compliant operating system further comprises a Windows NT operating system.

11. The method of claim 5, wherein the registry key further comprises the HKEY_LOCAL_MACHINE/HARDWARE/RESOURCEMAP/Plug and Play Manager/Plug and Play Manager registry key.

12. The method of claim 5, wherein determining that the main resource descriptor is translated further comprises identifying the character string "translated" in the main resource descriptor.

13. The method of claim 5, wherein determining from the main resource descriptor that the device is installed further comprises identifying the character string "NTPNP" in the main resource descriptor.

14. The method of claim 5, wherein the data structure further comprises the CM_RESOURCE_LIST data structure.

15. The method of claim 5, wherein the memory address location further comprises base address register 0.

16. A method of enabling a device driver to access a translated resource descriptor of a hardware device connected to a bus, comprising:
 accessing a registry of an operating system;
 determining that the registry contains a resource list;
 accessing a resource descriptor in the resource list;
 making a determination that the resource descriptor is translated;
 accessing a partial resource descriptor of the translated resource descriptor;
 accessing basic input/output system (BIOS)-assigned configuration information for the hardware device;
 comparing a memory address location of the BIOS-assigned configuration information to the memory address location of the partial resource descriptor; and
 selecting the translated resource descriptor containing the partial resource descriptor with the memory address location that matches the memory address location of the BIOS-assigned configuration information.

17. The method of claim 16, wherein the hardware device further comprises a Plug-and-Play (PnP) hardware device.

18. The method of claim 16, wherein the operating system further comprises a Windows PnP compliant operating system.

19. An article of manufacture comprising a machine-accessible medium having stored thereon sequences of instructions that, when executed by the machine, cause the machine to:
 access a registry of a Windows PnP compliant operating system;
 access a registry key of the registry;
 determine whether the registry key is empty;
 determine whether a subkey of the registry key contains a resource list;
 determine whether a main resource descriptor of the resource list is translated;
 determine whether a translated main resource descriptor is for an installed device;
 convert the translated main resource descriptor to a data structure for the device driver;
 access a partial resource descriptor of the translated main resource descriptor;
 access raw basic input/output system (BIOS)-assigned configuration information for a device connected to a bus;
 compare a memory address in base address register 0 of the partial resource descriptor to a memory address in base address register 0 of the BIOS-assigned configuration information; and
 select the main resource descriptor containing the partial resource descriptor with the memory address in base address register 0 that matches the memory address in base address register 0 of the BIOS-assigned configuration information.

20. The article of claim 19, wherein the device driver further comprises a kernel mode device driver.

21. The article of claim 19, wherein the Windows PnP compliant operating system further comprises a Windows NT operating system.

22. The article of claim 19, wherein the registry key further comprises the HKEY_LOCAL_MACHINE/HARDWARE/RESOURCEMAP/Plug and Play Manager/Plug and Play Manager registry key.

23. The article of claim 19, wherein determining that the main resource descriptor is translated further comprises identifying the character string "translated" in the main resource descriptor.

24. The article of claim 19, wherein determining that the translated main resource descriptor is for an installed device further comprises identifying the character string "NTPNP" in the translated main resource descriptor.

25. The article of claim 19, wherein the data structure further comprises the CM_RESOURCE_LIST data structure.

26. The article of claim 19, wherein the device further comprises a network adapter.

27. The article of claim 19, wherein the bus further comprises a Peripheral Component Interconnect bus.

28. The article of claim 19, wherein the bus further comprises a Universal Serial Bus.

29. A device driver in a computer system, comprising:
- a partial resource descriptor accesser to access a partial resource descriptor of a translated main resource descriptor of a resource list of a registry key of a registry of a Windows Plug-and-Play compliant operating system;
- a PCI configuration space accesser to access a Peripheral Component Interconnect (PCI) configuration space containing raw basic input/output system (BIOS)-assigned PCI configuration information for a Plug-and-Play device connected to a PCI bus;
- a memory address collector to collect a memory address of the partial resource descriptor and the memory address of the raw BIOS-assigned PCI configuration information,
- a memory address comparer to compare the memory address of the partial resource descriptor to the memory address of the raw BIOS-assigned PCI configuration information; and
- a main resource descriptor retriever to retrieve the translated main resource descriptor containing the partial resource descriptor with the memory address that matches the memory address of the raw BIOS-assigned configuration information.

30. The device driver of claim 29, wherein the device driver comprises a kernel mode device driver.

31. The device driver of claim 29, wherein the registry key further comprises the HKEY_LOCAL_MACHINE/HARDWARE/RESOURCEMAP/Plug and Play Manager/Plug and Play Manager registry key.

32. The device driver of claim 29, wherein the memory address further comprises the memory address in base address register 0.

* * * * *

UNITED STATES PATENT AND TRADEMARK OFFICE
CERTIFICATE OF CORRECTION

PATENT NO. : 6,931,646 B2
DATED : August 16, 2005
INVENTOR(S) : Dubal

It is certified that error appears in the above-identified patent and that said Letters Patent is hereby corrected as shown below:

<u>Column 4,</u>
Line 46, delete "NLLL" and insert -- NULL --.

Signed and Sealed this

Fifteenth Day of November, 2005

JON W. DUDAS
*Director of the United States Patent and Trademark Office*